United States Patent
Brockhaus

(10) Patent No.: US 10,657,072 B2
(45) Date of Patent: May 19, 2020

(54) FLOWMETER, IN PARTICULAR FOR USE IN CUSTODY TRANSFER

(71) Applicant: KROHNE Messtechnik GmbH, Duisburg (DE)

(72) Inventor: Helmut Brockhaus, Oberhausen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 250 days.

(21) Appl. No.: 15/444,700

(22) Filed: Feb. 28, 2017

(65) Prior Publication Data
US 2017/0255570 A1  Sep. 7, 2017

(30) Foreign Application Priority Data
Mar. 4, 2016  (DE) .................. 10 2016 104 013

(51) Int. Cl.
*G06F 12/14* (2006.01)
*G01F 15/00* (2006.01)
*G01F 15/06* (2006.01)

(52) U.S. Cl.
CPC ........ *G06F 12/1425* (2013.01); *G01F 15/007* (2013.01); *G01F 15/068* (2013.01); *G06F 2212/1052* (2013.01)

(58) Field of Classification Search
CPC combination set(s) only.
See application file for complete search history.

(56) References Cited

U.S. PATENT DOCUMENTS

| | | | |
|---|---|---|---|
| 6,997,162 B2 | 2/2006 | Hirayama et al. | |
| 7,265,928 B2 | 9/2007 | Yip | |
| 7,383,815 B2 | 6/2008 | Hirayama et al. | |
| 8,285,506 B2 | 10/2012 | Oldham et al. | |
| 9,581,485 B2 | 2/2017 | Haynes et al. | |
| 2007/0171561 A1* | 7/2007 | Yip .................. | G11B 15/07 360/69 |

FOREIGN PATENT DOCUMENTS

DE   10 2008 002 027 A1   12/2009

* cited by examiner

*Primary Examiner* — Yong J Choe
(74) *Attorney, Agent, or Firm* — David S. Safran; Roberts Calderon Safran & Cole, P.C.

(57) ABSTRACT

A flowmeter for use in custody transfer, having a housing, at last one evaluation unit arranged in the housing and having an interface arranged in the housing for communication with an external control unit that can be written with data via the interface. Inadmissible influencing of the evaluation unit is prevented by at least two write protection sensor elements being arranged in the housing, by the outside of the housing having a receptacle for at least one write protection influencing element that sets the write protection sensor elements into a write protection state when inserted in the receptacle, and by the write protection state of the write protection sensor elements being detected by the evaluation unit. In detecting the write protection state of at least one of the write protection sensor elements by the evaluation unit, writing the evaluation unit with data via the interface is at least partially inhibited.

15 Claims, 4 Drawing Sheets

FLOWMETER, IN PARTICULAR FOR USE IN CUSTODY TRANSFER

BACKGROUND OF THE INVENTION

Field of the Invention

The invention relates to a flowmeter, in particular for use in custody transfer, having a housing, at least one evaluation unit arranged in the housing and having an interface arranged in the housing for communication with an external control unit, wherein the evaluation unit can be written with data via the interface.

Description of Related Art

Flowmeters of the above type are known from the prior art in various designs. Special conditions are required in flowmeters for use in custody transfer, in particular because fair trade needs to be ensured or because measuring accuracy is a benefit to the public, often due to a quantity-based tax being raised on the transported and extracted medium.

Custody transfer occurs when the possession of a fluid, such as oil, gas, water, or steam, changes hands from one owner to another. The owner could be, for example, an oil or gas production company, a pipeline company, or a utility company. What typically happens in a custody-transfer flow measurement situation is that one or two custody-transfer flowmeters measure the volume or mass of fluid before the transfer is made, and then another set of flowmeters measures the flow after the transfer. What makes custody transfer unique among flowmeter applications is that money changes hands and that accuracy requirements are higher than they are for most other applications.

Custody transfer flow measurements are subject to a plurality of legal and institutional regulations, through which a particular certainty of the measurements is ensured. For example, regulations of the International Organization of Legal Metrology (Organisation Internationale de Métrologie Lègale (OIML)), here, for example, the OIML Certificate R 117 for measuring systems of liquids other than water. Recommendations of the OIML are often incorporated into national standards and, thus, are held in regard world-wide. A European guideline addressing the requirements for authorizing a measuring device for use in custody transfer is the guideline 2004/22/EG of the European Union.

A central characteristic of flowmeters for use in custody transfer is its tamper protection. It should be ruled out with great probability, that a flowmeter for use in custody transfer can be tampered with from outside in such a manner that its measuring accuracy is no longer ensured or, respectively, that the measurement is falsified. This could take place in that, for example, calibration parameters set by an official inspection authority and stored in the flowmeter are overwritten. Such a tampering is by all means to be prevented in the respect that a tampering with technical means is made more complicated and that successful tampering is clearly recognizable.

It is known that the opening of flowmeters or the housings of these flowmeters is prevented using a seal, so that influencing the flowmeter is made possible first when the seal is broken and, thus, is detectable. Modern flowmeters can often no longer be easily opened, for example, due to provided explosion protection measures.

SUMMARY OF THE INVENTION

Thus, the object of the present invention is to provide a safety mechanism against influencing flowmeters, which have an integrated interface, via which the evaluation unit of the flowmeter can be influenced, in which, thus, something other than purely mechanical access control is implemented.

The above derived and described object is achieved with the flowmeter described in the introduction in that at least two write protection sensor elements are arranged in the housing, that the outside of the housing has a receptacle for at least one write protection influencing element, that the write protection influencing element sets the write protection sensor elements into a write protection state when inserted in the receptacle, that the write protection state of the write protection sensor elements is detected by the evaluation unit, wherein, in detecting the write protection state of at least one of the write protection sensor elements by the evaluation unit, writing the evaluation unit with data via the interface is at least partially inhibited.

The interface arranged in the housing of the flowmeter is used for transmitting data beyond the housing limitations of the flowmeter, i.e., from an external control unit located outside of the housing of the flowmeter to the evaluation unit arranged within the housing of the flowmeter or, respectively, from the evaluation unit to the control unit. The interface can be implemented by an electromechanical coupling, i.e., a plug and socket construction, it is also possible that the interface is a radio module implementing the exchange of information between the evaluation unit of the flowmeter and an external control unit via electromagnetic waves—in a visible or non-visible range.

The exchange of data occurs by means of a vendor-independent, standardized communication protocol or via a vendor-dependent—i.e., proprietary—communication protocol.

In particular, when the flowmeter implements measures of explosion protection, the interior of the flowmeter is not easily accessible. This means that, for example, calibration data obtained during custody transfer is transported via the interface in the evaluation unit of the flowmeter and has to be stored there.

The implementation according to the invention of protection against improper writing of the evaluation unit with data also functions beyond the limitation of the housing of the flowmeter. Thereby, it is possible to activate the writing protection in the flowmeter using the write protection influencing element to be mounted outside of the housing, wherein the write protection influencing element is inserted in the receptacle provided on the outside of the housing. The write protection influencing element placed there influences—actively or passively—the at least two write protection sensor elements arranged within the housing of the flowmeter.

The influence—of whatever type—of the at least two write protection sensor elements by the write protection influencing element is detected by the evaluation unit. The evaluation unit is, thus, in some manner,—directly or via a measurement technology interconnection—connected to the write protection sensor elements (or also with only one write protection sensor element), so that the influencing state of the write protection sensor element can be evaluated by it. It is not necessarily required that the evaluation unit be physically connected to both write protection sensor elements, the influencing state of both write protection sensor elements can be made accessible by recording only one, individual measurement signal.

It has been recognized according to the invention that, by using at least two write protection sensor elements, a much greater measure of safety against external influence to be prevented is possible than the case of only one write protection sensor element. As a result, the flowmeter is designed so that writing of the evaluation unit with data via the interface is possible in the non-inserted state of the write protection influencing element, whereas, when positioning the write protection influencing element in the receptacle on or in the side of the housing, writing of the evaluation unit with data is prevented via the interface. The influencing state of the write protection sensor element is evaluated by the evaluation unit for this and a writing of the evaluation unit with data is prevented via the interface in the case that a write protection state is detected.

According to a preferred design of the flowmeter, it is provided that, when a write protection state is detected, at least one of the write protection sensor elements prevents the writing of the evaluation unit at least with such data via the interface, which pertain to the determination of the measured flow value, in particular, thus, a writing of the evaluation unit is prevented in such a manner that the calibration data stored in the evaluation unit is manipulated.

According to a preferred design of the flowmeter, when the write protection state is detected, at least one of the write protection sensor elements prevents the writing of the evaluation unit, in that the interface is completely deactivated. Thus, in this case, no data can be exchanged via the interface. It is possible to stop energy supply to the interface, for example, or the respective software routine that implements data exchange via the interface could be deactivated. According to another preferred design of the flowmeter, it is provided that the entire interface is not deactivated, but rather that the writing of certain storage areas of the evaluation unit is blocked, in particular the storage areas, in which the calibration data for the flowmeter is stored. In this variation, it is further possible to exchange information with the flowmeter via the interface, however, this it is no longer possible to influence the flowmeter in a manner significant for the measurement result.

An advantageous further development of the flowmeter according to the invention is implemented in that the receptacle is designed so that the write protection influencing element is held in a defined manner when inserted in the receptacle and the position of the write protection influencing element is protected by a seal. For example, the seal can be a lead seal or a seal label. For example, the write protection influencing element can be held by a lid that can be placed on the housing, wherein the lid is held on the housing by the seal, the write protection influencing element, itself, does not have to come into contact with the seal. It is important that the write protection influencing element can only be removed from the receptacle by breaking the seal, and thus, the write protection state of the flowmeter is canceled.

When discussing an evaluation unit here, this doesn't mean that this evaluation unit has to be present in one single continuous electronic module, rather it can also be dispersed electronic components. The evaluation unit normally has at least one microcontroller or a microprocessor with the normal interfaces or periphery components, i.e., the evaluation unit normally represents an embedded computing system.

In a preferred variation of the flowmeter according to the invention, the write protection sensor elements are designed as magnetic field sensors and the write protection influencing element is designed as a magnet—in particular, a permanent magnet. The magnetic field sensors are naturally arranged within the housing so that they are in the effective range of the write protection influencing element, i.e., the magnets, in the holder.

It can be attempted to compensate the magnetic field of the write protection influencing element designed as a magnet by means of an improperly used strong magnet. However, this is practically impossible with two write protection sensor elements in the form of magnetic field sensors, in particular when the magnetic field sensors are arranged in a certain manner to one another and to the write protection influencing element, whereby reference is made here to the description of the figure.

In addition to the active solution with an active permanent magnet acting on the write protection sensor elements, passive implementations of the flowmeter according to the invention are also possible. In an alternative implementation of the flowmeter according to the invention, the write protection sensor elements are designed as a first electric conducting surface and a second electric conducting surface facing one another, so that they form a write protection capacitor. Further, the write protection influencing element is formed as a third electric conducting surface, wherein this third conducting surface is opposite the write protection capacitor in the mounted state in the receptacle and forms a capacitive voltage divider with it. The third conducting surface, which implements the write protection influencing element, does not actively affect the at least two write protection sensors in this case, however, it forms a geometrically constructive capacitor arrangement with the first and the second electric conducting surfaces of the write protection sensor elements, the arrangement having a different physical behavior than in the case of no third electric conducting surface in the receptacle of the housing. When the write protection capacitor is accordingly connected in the flowmeter, these physical changes can be detected by measurement by the evaluation unit and, in this manner, distinctly evaluated in view of the presence or absence of the write protection influencing elements.

In detail, there is a plurality of possibilities for designing and further developing the flowmeter according to the invention for use in custody transfer as will be apparent from the following description in conjunction with the accompanying drawings.

DETAILED DESCRIPTION OF THE INVENTION

Figure 1:
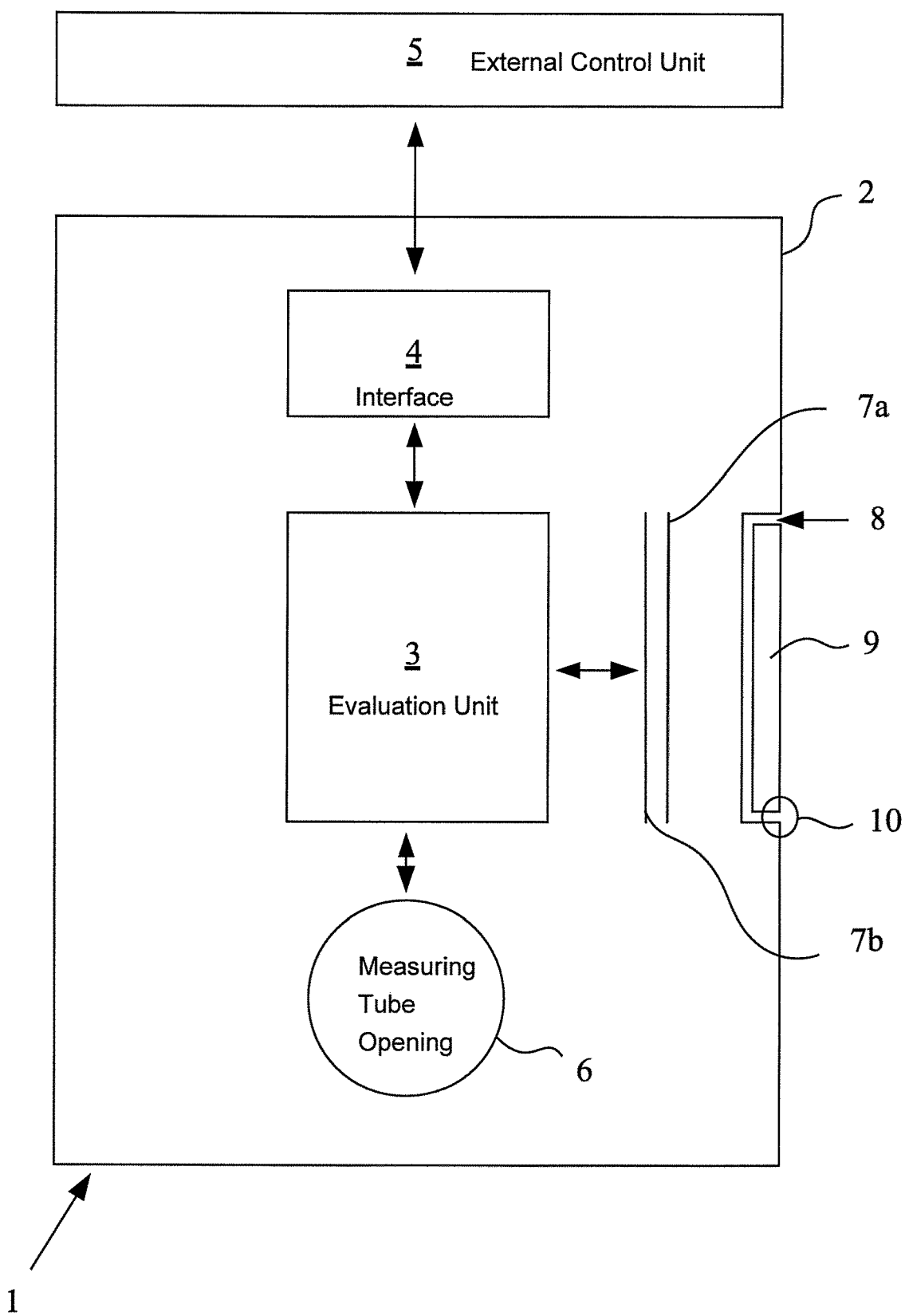
FIG. 1 is a schematic representation of a flowmeter according to the invention for use in custody transfer.

A flowmeter 1 is shown in FIG. 1 in a completely schematic manner, which is designed for use in custody transfer. The flowmeter 1 has a housing 2, in which an evaluation unit 3 and an interface 4 are arranged for communication with an external control unit 5. Further, a measuring tube opening 6 is indicated, through which a medium flows that can be detected by measurement. It is illustrated by the double arrows between the evaluation unit 3 and the measuring tube opening 6 that the evaluation unit—regardless of measuring principle—measures the flow through the measuring tube, which is the main task of the flowmeter 1.

Two write protection sensor elements 7a, 7b are arranged in the housing 2 of the flowmeter 1, with which a write protection function is implemented. The outer housing side of the housing 2 has one receptacle 8 for a write protection influencing element 9. The flowmeter 1 is designed so that the write protection influencing element 9 is set into a write protection state when the write protection sensor elements 7a, 7b are inserted in the receptacle 8, wherein the write protection state of the write protection sensor elements 7a, 7b is measured, i.e., detected, which is indicated by the double arrows. The evaluation unit 3 is designed so that at least one of the write protection sensor elements 7a, 7b at last partially prevents writing of the evaluation unit 3 with data via the interface 4 when the write protection state is detected.

The shown flowmeter 1 is encapsulated for reasons of explosion protection, so that the housing 2 cannot be easily opened. The interface 4 is designed so that, nevertheless, data exchange can be implemented with the external control unit 5, presently this is an interface 4 based on radio technology. In this case, the control unit 5 is a hand held device that is able to contact the flowmeter 1, for example, also in the mounted state in the process. In other embodiments, the interface 4 is a hardware interface on the basis of galvanic connection technology.

The particular advantage of the shown flowmeter 1 is that the use of at least two write protection sensor elements 7a, 7b leads to a write protection state being implemented with a very high safety.

In the flowmeter 1 shown in FIG. 1, the write protection state of at least one of the write protection sensor elements 7a, 7b is detected by the evaluation unit 3. If even only one of the write protection sensor elements 7a, 7b is in a write protection state, the writing of the evaluation unit 3 with data pertaining to the determination of the flow via the interface is prevented. In the present case, the writing of the evaluation unit 3 with calibration data is prevented. This ensures that the flowmeter 1 is influenced in a manner significant for the determination of the flow, when the write protection influencing element 9 is inserted in the receptacle 8.

It is indicated in FIG. 1 that the receptacle 8 is designed so that the write protection influencing element 9 is held in a defined manner when inserted in the receptacle 8 and the position of the write protection influencing element 9 is protected by a seal 10. In the present case, the seal 10 is a lead seal. Only after removing the lead seal, and thus after breaking the seal 10, is it possible to remove the write protection influencing element 9 from the receptacle 8, so that the write protection sensor elements 7a, 7b are no longer influenced by the write protection influencing element 9 and, thus, a write protection state of the write protection sensor elements 7a, 7b can no longer be detected. The breaking of the seal itself, and with it the possible influencing of the flowmeter 1, is easily recognizable.

Figure 2:
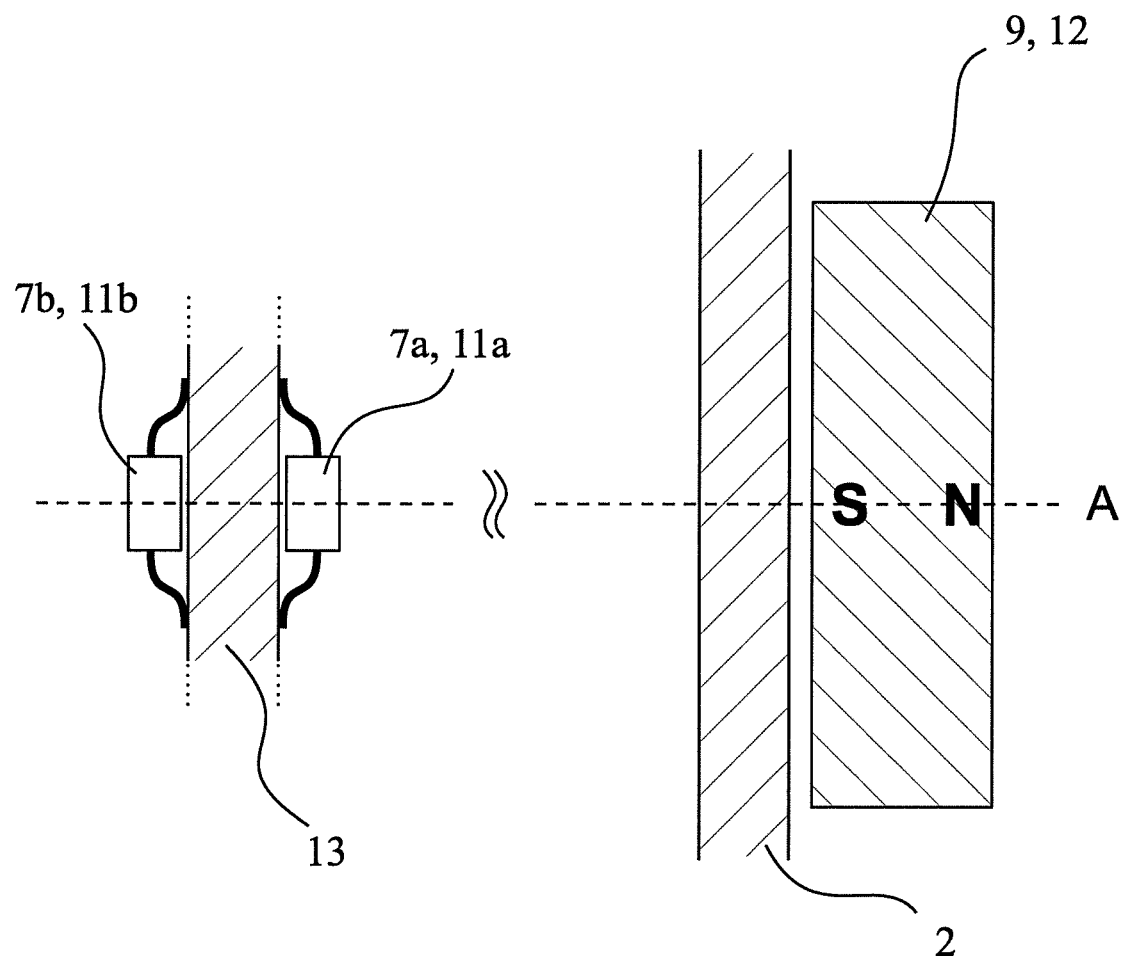
FIG. 2 is a schematic representation of the implementation of a write protection in a flowmeter according to the invention on the basis of magnetic field sensors with a permanent magnet.

How a special technical implementation of the write protection function of the above-described flowmeter 1 can be implemented is schematically shown in FIG. 2. Here, the write protection sensor elements 7a, 7b are designed as magnetic field sensors 11a, 11b and the write protection influencing element 9 is designed as a magnet 12, presently as a permanent magnet 12. In the shown case, the magnet 12 and the magnetic field sensors 11a, 11b are arranged co-linearly. In the inserted state of the magnet 12 in the receptacle 8—only a section of the housing 2 being shown here—, the field lines of the magnetic flux density of the magnet 12 run essentially in the direction of the co-linear arrangement of the magnet 12 and the magnetic field sensors 11a, 11b. Though the magnetic field lines are not shown in FIG. 2, it is, however, shown that the magnetic field sensors 11a, 11b and the magnet 12 are located on one axis A and the polarity of the permanent magnet 12 is also aligned in the direction of the axis, polarity being indicated by "S" and "N". The arrangement is clever because the magnetic field sensors 11a, 11b are located in the area of the greatest field strength of the permanent magnet 12 in this manner. It has been seen to be advantageous to arrange the magnet 12 and the magnetic field sensors 11a, 11b as close to one another as possible.

The representation in FIG. 2 is not to scale. A typical configuration might be that a permanent magnet having a diameter of 10 mm and a height of 5 mm is used at a wall strength of 2 mm of the housing 2 in order to stimulate a sufficient flux density. The magnetic field sensors 11a, 11b are designed as Hall limit switches, for example, in a specific embodiment by the component with the identification AH1802 from Diodes Incorporated. The magnetic field sensors 11a, 11b are attached to both sides of the circuit board 13 and are soldered into a circuit that is not described in detail. The distance of the magnetic field sensors 11a, 11b to one another can, for example be about one fifth of the average distance to the magnet. In the specific embodiment described above, the first magnetic field sensor 11a is arranged about 6.5 mm away from the magnet 12 and the second magnetic field sensor 11b is arranged about 9 mm away from the magnet 12, hereby reference is made to the nearest boundary of the magnet 12, in the shown embodiment, i.e., the boundary on which the south pole S is designed.

The advantage of the arrangement is that it is practically impossible to compensate the magnetic field of the magnet 12 with external influence by a further magnet in such a manner that both magnetic field sensors 11a, 11b designed as Hall limit switches simultaneously come into the non-influenced state. By using two write protection sensor elements 7a, 7b, a very high measure of safety against inadmissible manipulation is achieved.

In other embodiments, more than two write protection sensor elements can be used, however, it has been seen that simply the use of two write protection sensor elements as opposed to the use of one, single write protection sensor element achieves a substantial gain in safety, which is also sufficient for the requirements of devices for use in custody transfer.

The magnetic field sensors 11a, 11b designed as Hall limit switches have a typical limit, at which the limit switch switches and, for example, switches from a voltage-related high level to a low level at the output or vice versa. Preferably, the magnet 12 and the magnetic field sensors 11a, 11b designed as limit switches are arranged to and spaced from one another so that the magnet 12, when it is inserted in the receptacle 8 at the installation site of the magnetic field sensors 11a, 11b designed as limit switches, generates a magnetic flux that is at least twice as strong as the limit of the limit switch. In the shown embodiment, the magnetic flux generated at the installation site of the magnetic field sensors 11a, 11b by the magnet 12 is about eight times as strong as the limit switched by the Hall limit switch 11a, 11b. This measure makes it additionally difficult to influence the write protection arrangement from outside the flowmeter 1 in such a manner that both magnetic field sensors 11a, 11b move into the unblocked state. Especially in magnetic field sensors designed as limit switches that are independent of the polarity of the magnetic field, a relatively small window of the magnetic flux has to be reached in order to correspond to the limit switch. When the unblocked range, for example, is in the range of +/−2 mT and the magnetic field at the installation site of the first limit switch generated by the permanent magnet 12 has a magnetic flux of 20 mT and at the site of the second limit switch has a magnetic flux of 30 mT, then it is practically impossible to compensate the magnetic field at the installation site of both limit switches to a value between +/−2 mT with an external manipulating magnet.

Figure 3:
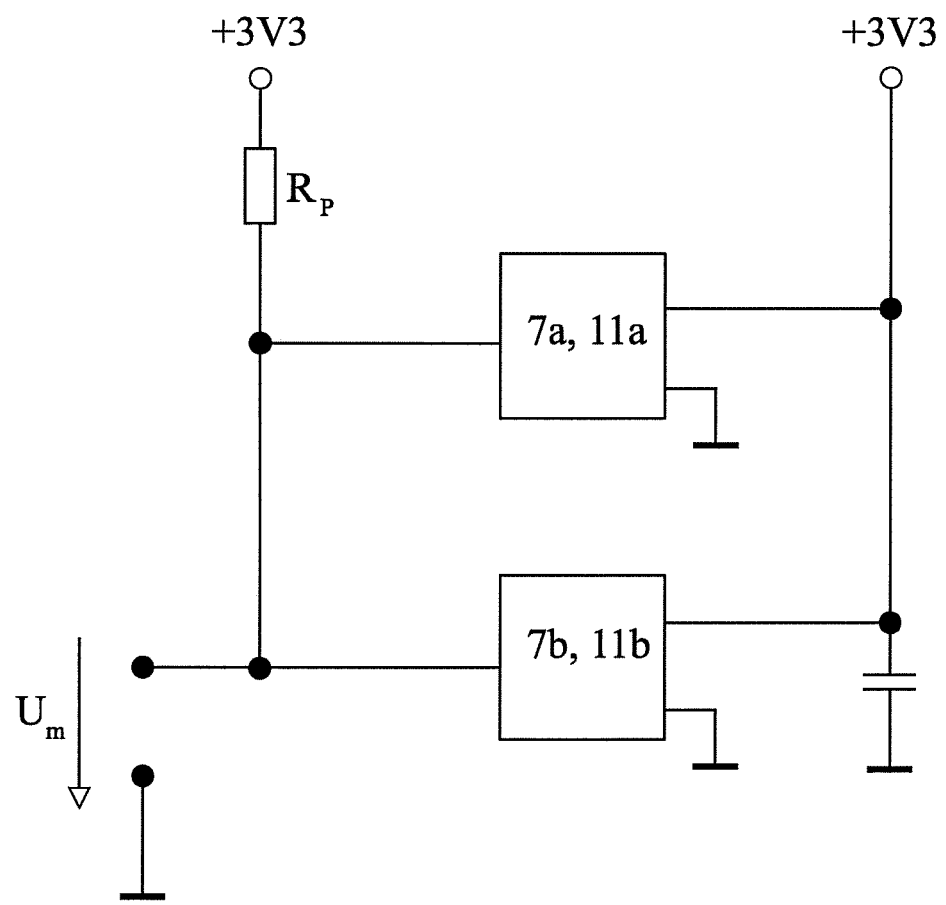
FIG. 3 is a schematic implementation of a measurement circuit on the basis of Hall limit switches.

Finally, a simple circuit is shown in FIG. 3, with which an evaluation of the Hall limit switch shown in FIG. 2 can be implemented—for example, implemented by a component of the type AH1802 from Diodes Incorporated. The magnetic field sensors 11a, 11b are Hall limit switches of the type described above. On the right side of the magnetic field sensors 11a, 11b, the voltage-related supply of the component is shown, on the left side, the electric outputs of the magnetic field sensors 11a, 11b are electrically matched and connected via a pull-up resistance $R_P$ at the operating voltage of 3.3 V. Since the outputs of the used Hall limit switches 11a, 11b are implemented by open drain switches, the detection voltage $U_m$ for the influencing state of the magnetic field sensors 11a, 11b goes to ground as soon as the output of one of the magnetic field sensors 11a, 11b is switched to ground. For this reason, the given switch of the write protection state is overall detected when even only one magnetic field sensor 11a, 11b is found in this state.

Figure 4:
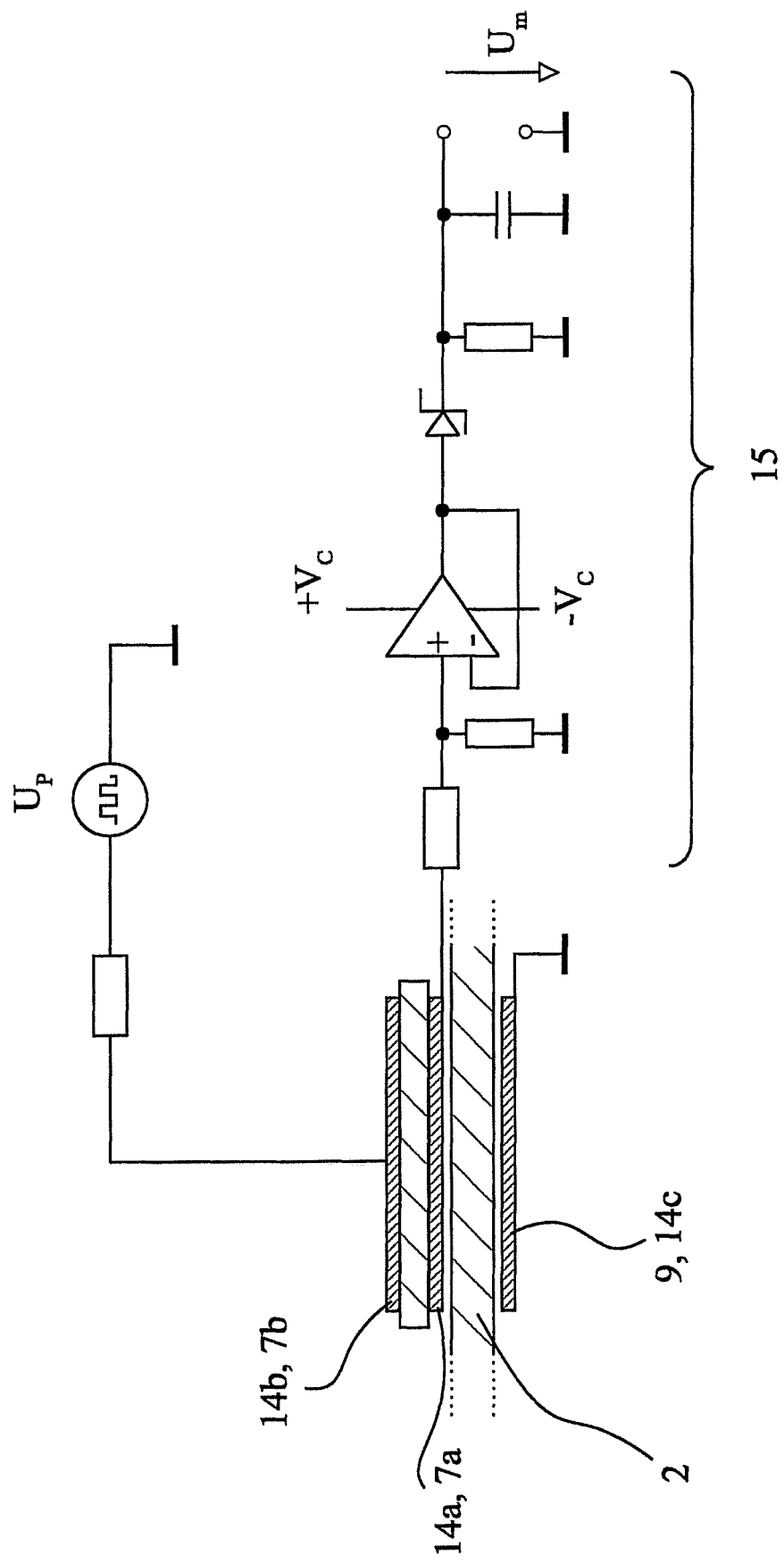
FIG. 4 is a schematic representation of the implementation of a write protection in a flowmeter according to the invention based on electric conducting surfaces implementing a capacitor arrangement, which acts as a capacitive voltage divider.

In the embodiment according to FIG. 4, another measuring principle is used. The write protection sensor elements 7a, 7b are designed as a first electric conducting surface 14a and a second electric conducting surface 14b facing one another, and thus, form a write protection capacitor. The write protection influencing element 9 is, as opposed to the above-described solution, designed as a passive influencing element 9, namely as a third electric, conducting surface 14c. The third conducting surface 14c is located opposite the write protection capacitor comprised of the first electric conducting surface 14a and the second electric conducting surface 14b in the mounted state in the receptacle, and with the capacitor, forms a capacitive voltage divider. Typically, the first electric conducting surface 14a, the second electric conducting surface 14b and the third electric conducting surface 14c are arranged parallel to one another, wherein the first electric conducting surface 14a and the third electric conducting surface 14c are separated from one another by the housing 2. In order to achieve an effective impact, the third electric conducting surface 14c should be grounded.

In the switch according to FIG. 4, the second conducting surface 14b of the write protection capacitor is impinged with a periodic electric voltage $U_P$, here, with a periodic electric voltage having an arithmetic mean not equal to zero, namely with a square wave voltage with a duty factor of 50%. Due to the capacitive coupling, the square wave voltage is also transmitted to the first electric conducting surface 14a. In the mounted state of the third electric conducting surface 14c on the housing wall 2 opposite the first electric conducting surface 14a—in particular, in grounding the third conducting surface 14c—the electric voltage that can be tapped by the first electric conducting surface 14a is reduced due to the forming of the capacitive voltage divider. The voltage difference between the influenced state of the write protection capacitor due to the third conducting surface 14c and the non-influenced state of the write protection capacitor due to the lack of a third conducting surface 14c can be measured and makes the write protection state of the write protection sensor elements 7a, 7b recognizable in the form of the write protection capacitor.

The voltage is tapped at a high-resistance at the first conducting surface 14a of the write protection capacitor using a measurement circuit 15 and is supplied at a low resistance to the evaluation unit 3, so that the evaluation unit 3 can carry out a respective evaluation of the write protection state.

It can be seen in FIG. 4 that the high-resistance input of the detection voltage from the first conducting surface 14a is implemented via a buffer amplifier implemented as operation amplifier. A peak value detector is implemented at the output of the operation amplifier with a Zener diode and a parallel RC element switched to ground, so that the measurement voltage $U_m$ exists in a direct voltage whose value is evaluated. The resistance connected in parallel to the capacitor is used for discharging the capacitor so that a peak value can only be held for a certain amount of time after being detected.

What is claimed is:

1. A flowmeter for use in custody transfer, comprising:
a housing,
a measuring tube in the housing,
an interface arranged in the housing for communication with an external control unit located outside of the housing,
at least one evaluation unit for measuring flow through the measuring tube, the at least one evaluation unit being arranged in the housing and being writable with data via the interface,
at least two write protection sensor elements arranged in the housing, and
a receptacle outside of the housing for at least one write protection influencing element,
wherein the write protection influencing element sets the write protection sensor elements into a write protection state when inserted in the receptacle,
wherein the evaluation unit is adapted to detect the write protection state of the write protection sensor elements, and
wherein writing the evaluation unit with data via the interface is at least partially inhibited during detecting of the write protection state of at least one of the write protection sensor elements by the evaluation unit.

2. The flowmeter according to claim 1, wherein, during detecting the write protection state of at least one of the write protection sensor elements, writing the evaluation unit with data that is related to determining a measured value of flow via the interface is inhibited.

3. The flowmeter according to claim 1, wherein, in detecting the write protection state of at least one of the write protection sensor elements, writing the evaluation unit is inhibited by deactivating the interface or by blocking writing of certain storage areas of the evaluation unit.

4. The flowmeter according to claim 1, wherein the receptacle is adapted to hold the write protection influencing element in a defined position when inserted in the receptacle and wherein the position of the write protection influencing element is protected by a seal, and wherein the write protection influencing element can only be removed from the receptacle by breaking the seal.

5. The flowmeter according to claim 1, wherein the write protection sensor elements are magnetic field sensors and wherein the write protection influencing element is a magnet.

6. The flowmeter according to claim 5, wherein the magnetic field sensors are Hall limit switches.

7. The flowmeter according to claim 5, wherein the magnet and the magnetic field sensors are arranged co-linearly, wherein, when the magnets are inserted in the receptacle, the field lines of the magnetic flux of the magnets run essentially in a direction of the co-linear arrangement of the magnets and the magnetic field sensors.

8. The flowmeter according to claim 7, wherein the magnetic field sensors are limit switches, and wherein, when the magnet is inserted in the receptacle at an installation site of the magnetic field sensors, the magnet is adapted to generate a magnetic flux that is at least twice as strong as the limit of the limit switches.

9. The flowmeter according to claim 8, the magnet is adapted to generate a magnetic flux that is at least eight times as strong as the limit of the limit switches.

10. The flowmeter according to claim 5, wherein the magnetic field sensors are arranged close together on two opposing sides of a circuit board.

11. The flowmeter according to claim 1, wherein the write protection sensors comprise a first electric conductivity surface and a second electric conductivity surface disposed opposite one another so as to form a write protection capacitor, and wherein the write protection influencing element is a third electric conductivity surface, and wherein the third conductivity surface is opposite the write protection capacitor when inserted in the receptacle and forms a capacitive voltage divider.

12. The flowmeter according to claim 11, wherein one of the first conductivity surface and the second conductivity surface of the write protection capacitor is impinged with a periodic electric voltage having an arithmetic mean not equal to zero.

13. The flowmeter according to claim 12, wherein the periodic electric voltage is a square wave voltage.

14. Flowmeter according to claim 12, wherein the third conductivity surface is grounded when inserted in the receptacle.

15. The flowmeter according to claim 11, wherein a self-adjusting voltage is tapped at a high resistance at one of the first conductivity surface and the second conductivity surface of the write protection capacitor using a measurement circuit, the self-adjusting voltage being supplied at a low resistance to the evaluation unit and evaluated by the evaluation unit.

* * * * *